(12) United States Patent
Wang (10) Patent No.: US 9,059,747 B2
(45) Date of Patent: Jun. 16, 2015

(54) METHOD FOR RAPID INFORMATION SYNCHRONIZATION USING NEAR FIELD COMMUNICATION

(71) Applicant: Wistron Corporation, New Taipei (TW)

(72) Inventor: Jun Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 114 days.

(21) Appl. No.: 14/036,332

(22) Filed: Sep. 25, 2013

(65) Prior Publication Data

US 2014/0141716 A1    May 22, 2014

(30) Foreign Application Priority Data

Nov. 16, 2012    (CN) .......................... 2012 1 0466561

(51) Int. Cl.
*H04B 5/00* (2006.01)
*H04B 7/00* (2006.01)

(52) U.S. Cl.
CPC .................................. *H04B 5/0031* (2013.01)

(58) Field of Classification Search
USPC ......................... 455/41.1, 41.2, 41.3; 370/338
See application file for complete search history.

(56) References Cited

U.S. PATENT DOCUMENTS

| 7,940,744 B2 * | 5/2011 | Lehotsky et al. | 370/338 |
| 7,974,536 B2 * | 7/2011 | Yu et al. | 398/115 |
| 8,483,610 B2 * | 7/2013 | Lortz | 455/41.1 |
| 2005/0154874 A1 * | 7/2005 | Koga | 370/260 |

FOREIGN PATENT DOCUMENTS

TW    201112159 A    4/2011

* cited by examiner

*Primary Examiner* — Quochien B Vuong
(74) *Attorney, Agent, or Firm* — Whyte Hirschboeck Dudek S.C.

(57) ABSTRACT

A method for rapid synchronization of information between first and second terminals using NFC is provided. When authentication between the first and second terminals is successful, the second terminal compares a prior configuration document stored therein with an updated configuration document most recently recorded thereby to obtain a difference therebetween that serves as a difference configuration document. Then, the second terminal transmits the difference configuration document to the first terminal. The first terminal thus performs setting corresponding to the difference configuration document.

6 Claims, 7 Drawing Sheets

METHOD FOR RAPID INFORMATION SYNCHRONIZATION USING NEAR FIELD COMMUNICATION

CROSS-REFERENCE TO RELATED APPLICATION

This application claims priority to Chinese Application No. 201210466561.1, filed on Nov. 16, 2012, the contents of which are hereby incorporated by reference.

BACKGROUND OF THE INVENTION

1. Field of the Invention

The invention relates to near field communication (NFC) applications, and more particularly to a method for rapid information synchronization using NFC.

2. Description of the Related Art

A user usually records a daily schedule in a calendar provided in his/her personal computer so as to obtain from his/her personal computer a reminder for a particular activity, such as a meeting, in the daily schedule. However, when the user goes away from his/her personal computer, the reminder cannot be obtained by the user.

On the other hand, people are used to carrying smart mobile devices, on which a calendar or memorandum may be recorded. However, for a user carrying a mobile device and having access to a personal computer, to synchronize calendar or memorandum information in the mobile device and the personal computer would require manual input operation on either the mobile device or the personal computer, or that a communication link be established between the mobile device and the personal computer. Therefore, information synchronization is inconvenient and time-consuming.

SUMMARY OF THE INVENTION

Therefore, an object of the present invention is to provide a method for rapid information synchronization using NFC that can overcome the aforesaid drawbacks of the prior art.

According to the present invention, there is provided a method for rapid synchronization of information between a first terminal and a second terminal using NFC. The first terminal includes a first NFC circuit, a memory for storing a synchronization module application and a prior configuration document therein, and a controller capable of reading the synchronization module application from the memory and executing the synchronization module application. The second terminal includes a second NFC circuit, a storage device for storing the prior configuration document, and a processor. The second terminal has an updated configuration document more recently recorded thereby than the prior configuration document. The method of this invention comprises the steps of:

a) performing authentication between the first and second terminals;

b) when the authentication performed in step a) is successful, the processor of the second terminal comparing the prior configuration document from the storage device with the updated configuration document to obtain a difference configuration document representative of a difference between the prior configuration document and the updated configuration document;

c) the second terminal transmitting the difference configuration document through the NFC circuit thereof to the first terminal; and d) upon receipt of the difference configuration document by the first terminal through the first NFC circuit, the controller of the first terminal performing setting in accordance with the difference configuration document.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
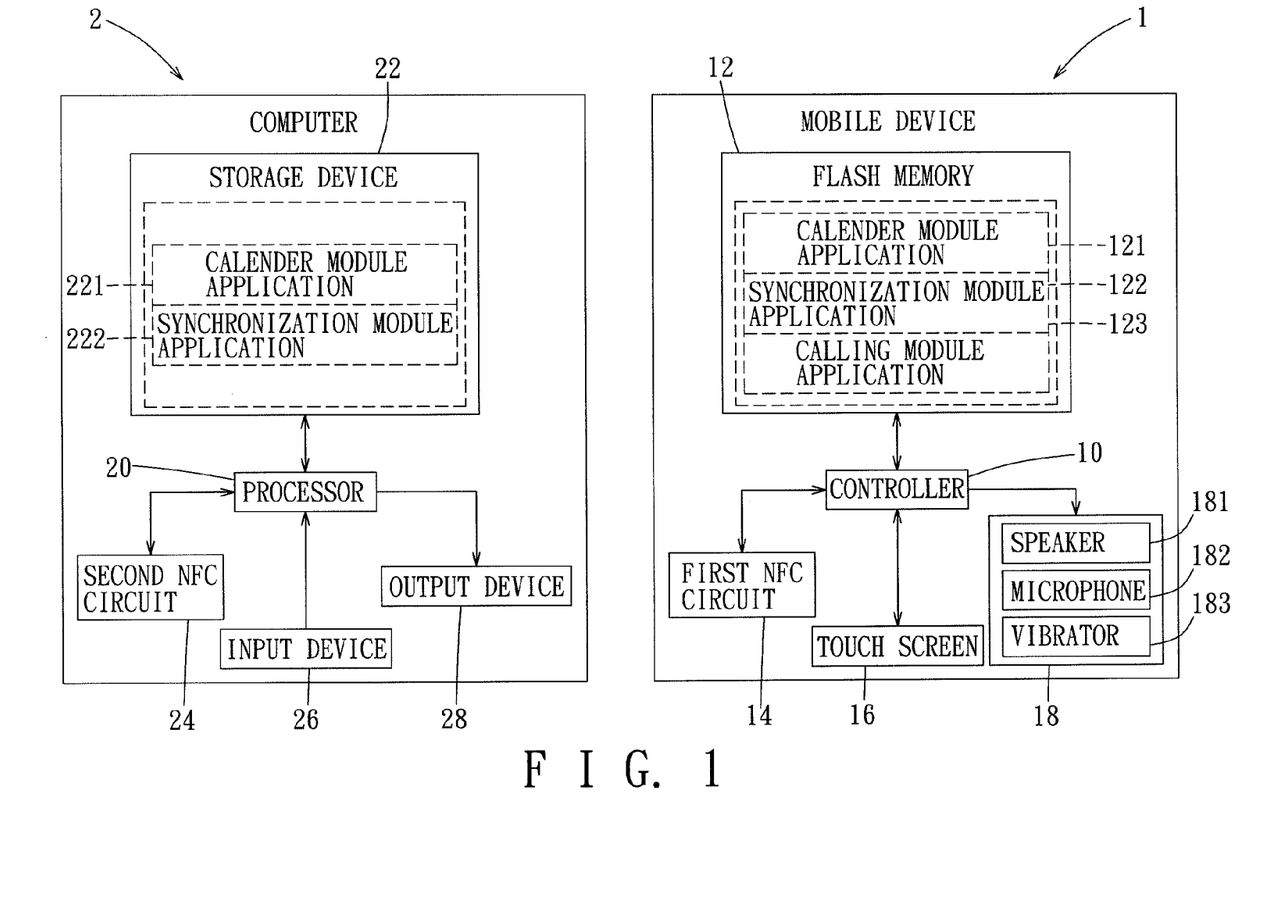
FIG. 1 is a schematic block diagram of a mobile device and a computer that are configured for implementing the preferred embodiment of a method for rapid information synchronization using NFC of the present invention.

FIG. 1 illustrates a mobile device 1 and a computer 2 that are configured for implementing the preferred embodiment of a method for rapid information synchronization using NFC of the present invention. The mobile device 1 and the computer 2 respectively serve as a first terminal and a second terminal. In other embodiments, each of the first and second terminals can be an electronic device having NFC functionality.

The mobile device 1, such as a mobile phone, includes a controller 10, a flash memory 12 coupled to the controller 10, a first NFC circuit 14 coupled to the controller 10, a touch screen 16 coupled to the controller 10, and an output device 18 coupled to the controller 10. The flash memory 12 stores a plurality of applications, for example, a calendar module application 121, a synchronization module application 122 and a calling module application 123. The controller 10 cooperates with the first NFC circuit 14 to execute the synchronization module application 122 so as to achieve information synchronization with the computer 2. The output device 18 includes, in this embodiment, a speaker 181, a microphone 182 and a vibrator 183.

The computer 2 includes a processor 20, a storage device 22 coupled to the processor 20, a second NFC circuit 24 coupled to the processor 20, an input device 26 coupled to the processor 20, and an output device 28 coupled to the processor 20. The storage device 22 stores a plurality of applications, for example, a calendar module application 221 and a synchronization module application 222. The input device 26 can include a mouse and a keyboard (not shown). The processor 20 cooperates with the second NFC circuit 24 to execute the synchronization module application 222 so as to achieve information synchronization with the mobile device 1.

Figure 2:
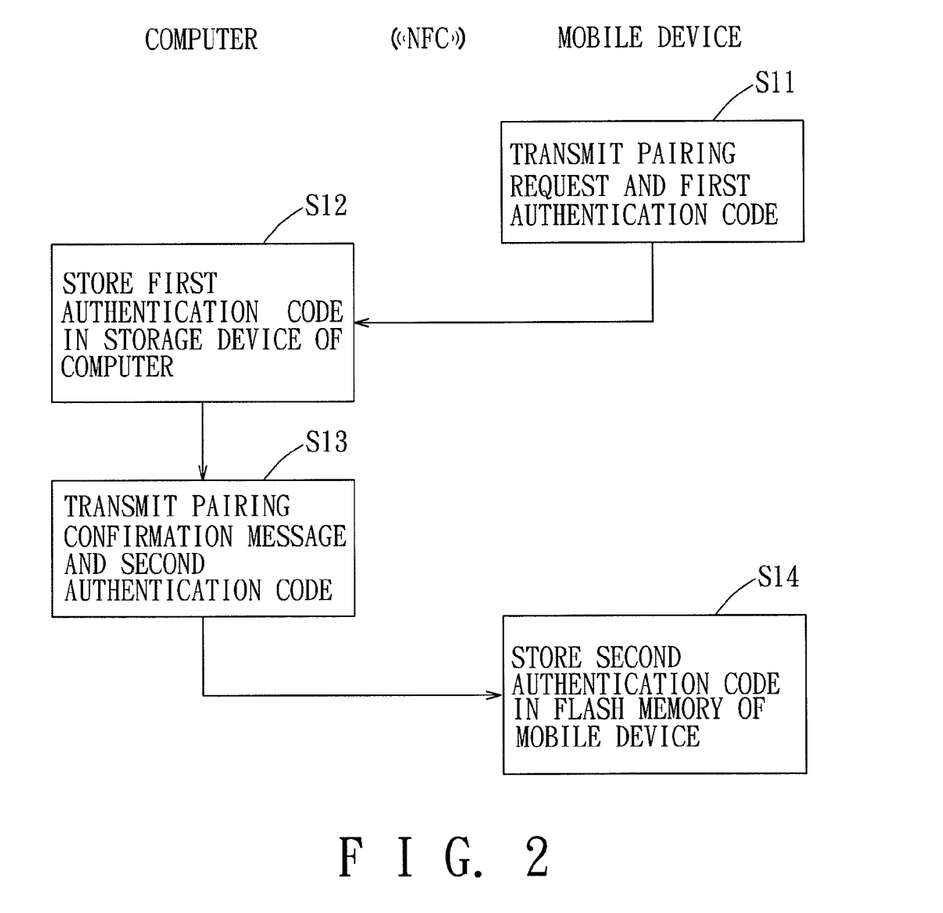
FIG. 2 is a flowchart illustrating how the mobile device and the computer implement a pairing procedure.

Prior to performing the preferred embodiment of the method for rapid information synchronization, a pairing procedure between the mobile device 1 and the computer 2 is required. FIG. 2 is a flow chart illustrating how the mobile device 1 and the computer 2 implement the pairing procedure. Upon the mobile device 1 being brought into close enough proximity to the computer 2, the mobile device 1 transmits a pairing request and a first authentication code, which uniquely corresponds to the mobile device 1, through the first NFC circuit 14 (step S11). Upon receipt of the pairing request and the first authentication code from the mobile device 1 by the second NFC circuit 24, the processor 20 of the computer 2 is configured to store the first authentication code in the storage device 22 (step S12). In this case, the first authentication code stored in the storage device 22 serves as a second reference authentication code. Then, in response to the pairing request, the computer 2 transmits a pairing confirmation message and a second authentication code, which uniquely corresponds to the computer 2, through the second NFC circuit 24 (step S13). Upon receipt of the pairing confirmation message and the second authentication code by the first NFC circuit 14, the controller 10 is configured to store the second authentication code in the flash memory 12 (step S14). In this case, the second authentication code stored in the flash memory 12 serves as a first reference authentication code. Thus, the paring procedure to exchange the first and second authentication codes is completed.

Figure 3:
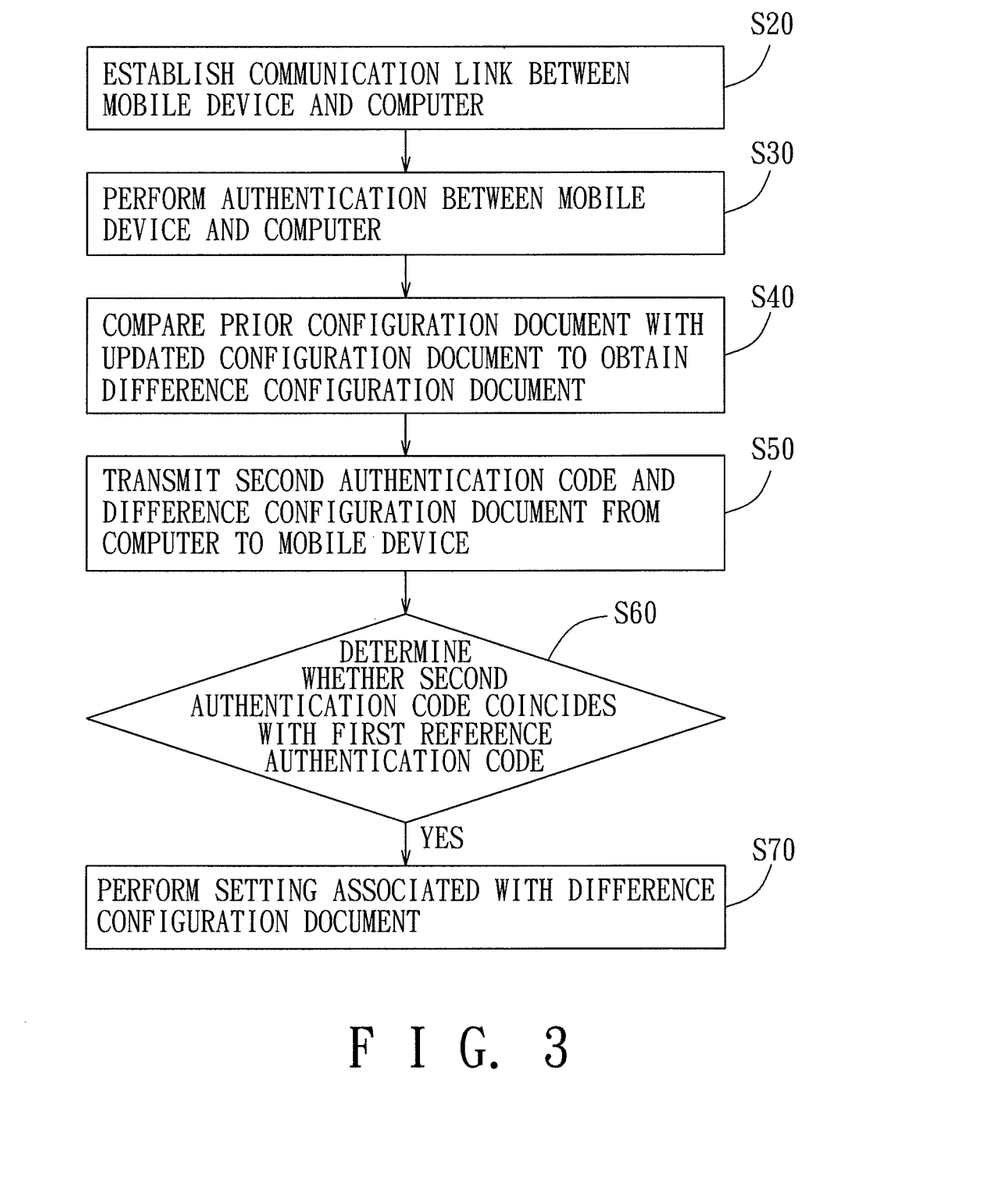
FIG. 3 is a flow chart of the preferred embodiment.

FIG. 3 is a flow chart of the preferred embodiment of the method for rapid synchronization of information between the mobile device 1 and the computer 2. It is noted that, in this embodiment, the flash memory 12 of the mobile device 1 and the storage device 22 of the computer 2 further include the same prior configuration document, for example, indicated by reference numeral 31 in FIGS. 6 and 7. It is further noted that, in this embodiment, the method demonstrates how to update an event calendar of the mobile device 1 to be synchronized with an event calendar of the computer 2.

In step S20, a communication link between the mobile device 1 and the computer 2 is established. In this embodiment, when the mobile device 1 and the computer 2 are in close enough proximity or contact with each other for several seconds, a communication link between the mobile device 1 and the computer 2 is established using the first and second NFC circuits 14, 24. Thereafter, the controller 10 of the mobile device 1 reads the synchronization module application 122 from the flash memory 12, and initiates execution of the synchronization module application 122. Similarly, the processor 20 of the computer 2 reads the synchronization module application 222 from the storage device 22, and initiates execution of the synchronization module application 222. In this case, a character or pattern, which indicates a synchronizing state, is displayed on the touch screen 16 of the mobile device 1 and by the output device 28 of the computer 2.

Figure 4:
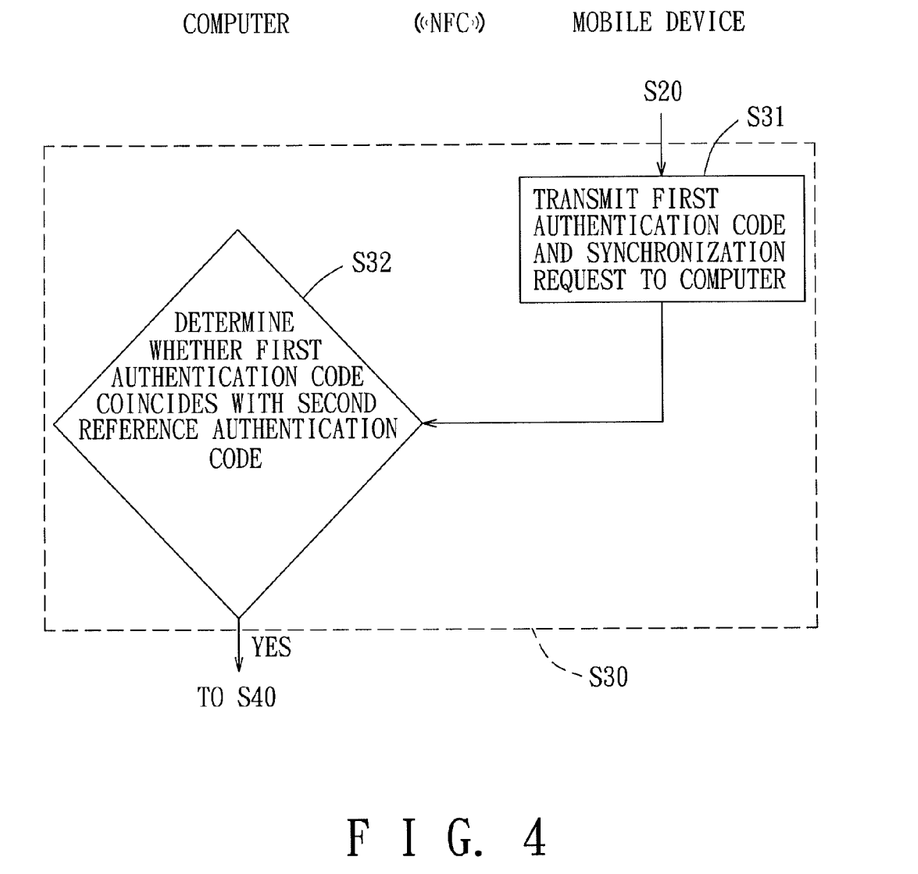
FIG. 4 is a flow chart of an exemplary procedure for performing authentication between the mobile device and the computer.

In step S30, authentication between the mobile device 1 and the computer 2 is performed via execution of one of the synchronization module applications 122, 222. In this embodiment, referring to FIG. 4, sub-steps S31, S32 of step S30 are shown to illustrate how to perform authentication between the mobile device 1 and the computer 2. In this case, the authentication between the mobile device 1 and the computer 2 for rapid information synchronization is initiated by the mobile device 1 via execution of the synchronization module application 122. In sub-step S31, the controller 10 of the mobile device 1 is configured to transmit the first authentication code and a synchronization request through the first NFC circuit 14 to the computer 2. In sub-step S32, upon receipt of the first authentication code and the synchronization request by the computer 2 through the second NFC circuit 24, the processor 20 of the computer 2 is configured to determine whether the first authentication code received thereby coincides with the second reference authentication code, which is pre-stored in the storage device 22 (in the pairing procedure). When it is determined that the first authentication code coincides with the second reference authentication code in sub-step S32, i.e., the authentication between the mobile device 1 and the computer 2 is successful, the flow proceeds to step S40.

Figure 5:
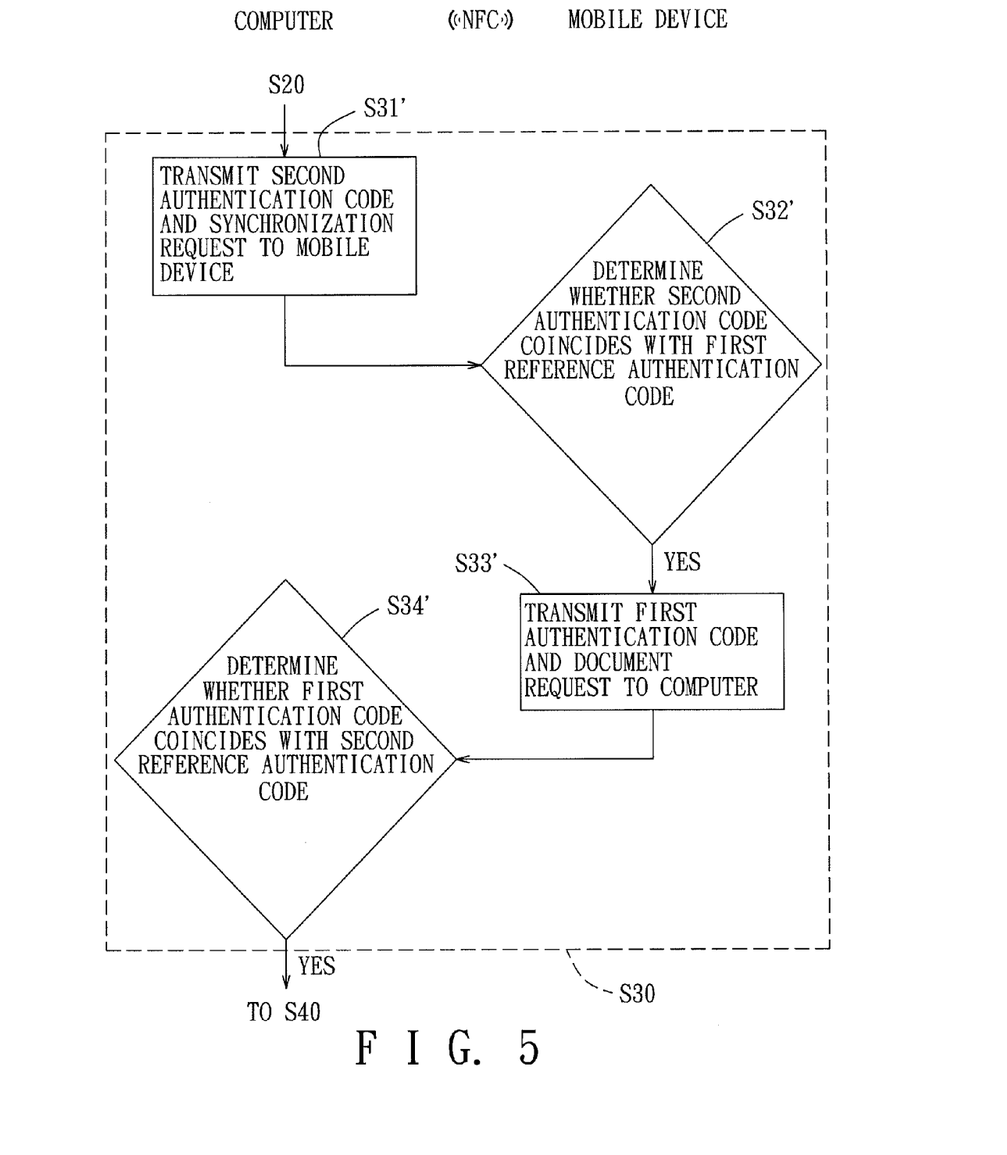
FIG. 5 is a flow chart of another exemplary procedure for performing authentication between the mobile device and the computer.

Alternatively, referring to FIG. 5, step S30 can include sub-steps S31'-S34'. In this case, the authentication between the mobile device 1 and the computer 2 for rapid information synchronization is initiated by the computer 2 via execution of the synchronization module application 222. In sub-step S31', the processor 20 of the computer 2 is configured to transmit the second authentication code and a synchronization request through the second NFC circuit 24 to the mobile device 1. In sub-step S32', upon receipt of the second authentication code and the synchronization request by the mobile device 1 through the first NFC circuit 14, the controller 10 of the mobile device 1 is configured to determine whether the second authentication code received by the mobile device 1 coincides with the first reference authentication code, which is pre-stored in the flash memory 12 (in the pairing procedure). When it is determined that the second authentication code coincides with the first reference authentication code in sub-step S32', the flow proceeds to sub-step S33'. In sub-step S33', the controller 10 of the mobile device 1 is configured to transmit the first authentication code and a document request through the first NFC circuit 14 to the computer 2 in response to the synchronization request transmitted from the computer 2 in sub-step S31'. In sub-step S34', upon receipt of the first authentication code and the document request by the computer 2 through the second NFC circuit 24, the processor 20 of the computer 2 is configured to determine whether the first authentication code received thereby coincides with the second reference authentication code, which is pre-stored in the storage device 22 (in the pairing procedure). When it is determined that the first authentication code coincides with the second reference authentication code in sub-step S34', the flow proceeds to step S40. In this case, when it is determined that the second authentication code coincides with the first reference authentication code in sub-step S32' while it is determined that the first authentication code coincides with the second reference authentication code in sub-step S34', the authentication between the mobile device 1 and the computer 2 is successful.

For example, the prior configuration document 31 is associated with calendar information. Prior to synchronization between the mobile device 1 and the computer 2, the processor 20 of the computer 2 executes the calendar module application 221 to update the event calendar provided by the computer 2 using input from the input device 26, thereby obtaining an updated configuration document, for example, as indicated by reference numeral 32 in FIGS. 6 and 7, that is associated with the updated event calendar and that is different from and more recent than the prior configuration document 31. The synchronization module application 222 is then executed either by a user or automatically in response to obtainment of the updated configuration document 32 so as to initiate the synchronization process with the mobile device 1.

Figure 6:
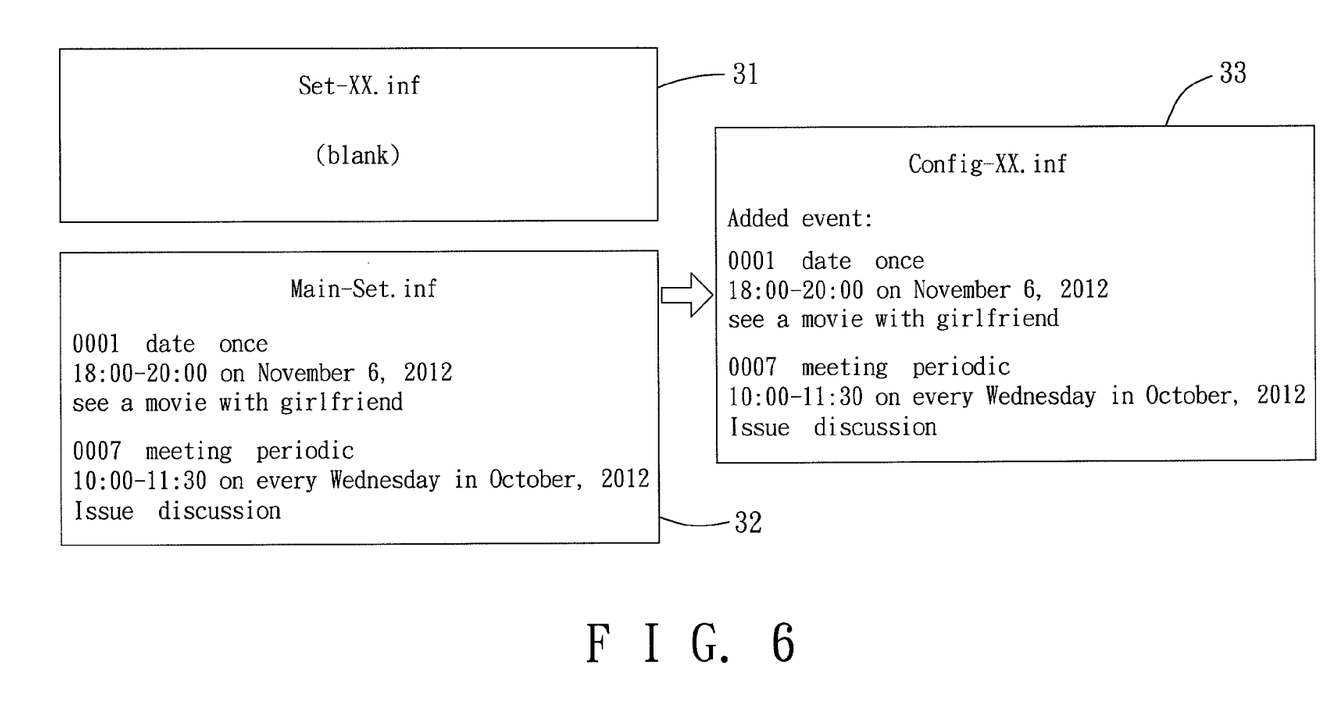
FIGS. 6 and 7 are schematic views illustrating relationships among a prior configuration document, an updated configuration document and a difference configuration document.
Figure 7:
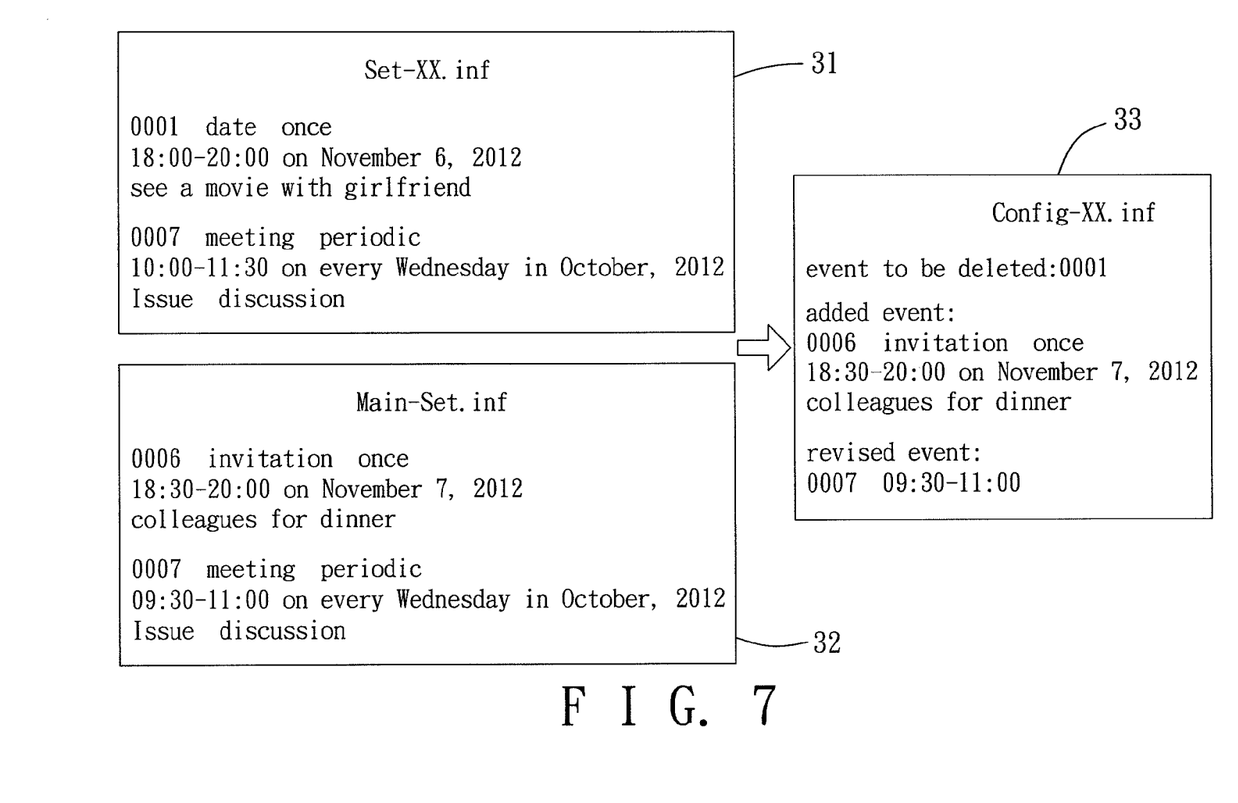

In step S40, the processor 20 of the computer 2 is configured to compare the prior configuration document 31 from the storage device 22 with the updated configuration document 32 to obtain a difference configuration document, for example, as indicated by reference numeral 33 in FIGS. 6 and 7, representative of the difference between the prior configuration document 31 and the updated configuration document 32. In this embodiment, each of the prior configuration document 31, the updated configuration document 32 and the difference configuration document 33 is an information document that is associated with the event calendar and that is in the form of, but not limited to, a .inf file. Each of the prior configuration document 31, the updated configuration document 32 and the difference configuration document 33 includes an event serial number, and at least one of an event type, a single/periodic event indication, a single-event time/periodic-event cycling condition, and an event description. Each of the calendar module applications 121, 221 stored respectively in the flash memory 12 of the mobile device 1 and the storage device 22 of the computer 2 is executable to manage the event calendar stored in the respective one of the flash memory 12 and the storage device 22.

For example, as shown in FIG. 6, upon first synchronization between the mobile device 1 and the computer 2, the prior configuration document 31, which is a file named "Set-XX.inf", is blank, where XX is a code representing the mobile device 1. The updated configuration document 32, which is a file named "Main-Set.inf", includes two events that are generated by execution of the calendar module application 221 via operation of the input device 26. In one event, "0001" is the event serial number, "date" is the event type, "once" indicates that the event is a single event, "18:00-20:00 on Nov. 6, 2012" is the single-event time condition, and "see a movie with girlfriend" is the event description. Similarly, in another event, "0007" is the event serial number, "meeting" is the event type, "periodic" indicates that the event is a periodic event, "10:00-11:30 on every Wednesday in October 2012" is the periodic-event cycling condition, and "issue discussion" is the event description. Therefore, in accordance with step 40, the difference configuration document 33, which is a file named "Config-XX.inf", is thus obtained to include two added events identical to those of the updated configuration document 32.

After the first synchronization between the mobile device 1 and the computer 2 is completed, as shown in FIG. 7, the content of the prior configuration document 31 is similar to that of the difference configuration document 33 of FIG. 6. In the example shown in FIG. 7, the updated configuration document 32 includes two events. In one event, "0006" is the event serial number, "invitation" is the event type, "once" indicates that the event is a single event, "November 7, 2012 18:30-20:00" is the single-event time condition, and "colleagues for dinner" is the event description. In another event, "0007" is the event serial number, "meeting" is the event type, "periodic" indicates that the event is a periodic event, "every Wednesday in October 2012 09:30-11:00" is the periodic-event cycling condition, and "issue discussion" is the event description. In this case, the difference configuration document 33 obtained in step 40 includes an event to be deleted, i.e., the event with the event serial number of 0001, an added event, i.e., the event with the event serial number of 0006, and a revised event, i.e., the event with the event serial number of 0007, in which 10:00-11:30 in the periodic-event cycling condition is to be revised to 09:30-11:00.

In step S50, the processor 20 of the computer 2 is configured to transmit the second authentication code and the difference configuration document 33 through the second NFC circuit 24 to the mobile device 1.

In step S60, upon receipt of the second authentication code and the difference configuration document 33 by the mobile device 1 through the first NFC circuit 14, the controller 10 of the mobile device 1 is configured to determine whether the second authentication code coincides with the first reference authentication code. When it is determined that the second authentication code coincides with the first reference authentication code in step S60, the flow proceeds to step S70.

In step S70, a character or pattern (not shown) indicating synchronization completion is displayed on both the touch screen 16 of the mobile device 1 and the output device 28 of the computer 2. In addition, the controller 10 of the mobile device 1 is configured to perform setting associated with the difference configuration document 33. In this embodiment, the setting performed by the controller 10 of the mobile device 1 is to update the event calendar, which is stored in the flash memory 12 of the mobile device 1, to be in synch with the event calendar of the computer 2 by executing the calendar module application 121 in accordance with the difference configuration document 33. Each event stored in the event calendar includes information of, for example, an event type, an event time and an event description. In addition, the setting performed by the controller 10 of the mobile device 1 is further to set a situation mode (or a ringing mode) of the mobile device 1 corresponding to each event in the event calendar in one of a general mode, a silent mode, a vibration mode, an outdoor mode and a quiet mode by executing the calling module application 123 in accordance with the event type and the event time of the event. The controller 10 of the mobile device 1 subsequently controls at least one of the speaker 181, the microphone 182 and the vibrator 183 in accordance with the situational mode during the time of the event. For example, in the general mode, a general ringtone is produced by the speaker 181 and the vibrator 183 vibrates upon an incoming call, and the microphone 182 generally collects sound during a call. In the silent mode, no ringtone is produced by the speaker 181 and the vibrator 183 does not vibrate upon an incoming call. In the vibration mode, no ringtone is produced by the speaker 181 but the vibrator 183 vibrates upon an incoming call. In the outdoor mode, a louder ringtone is produced by the speaker 181 and the vibrator 183 vibrates upon an incoming call. In the quiet mode, the sound collected by the microphone 183 is enhanced during a call.

An exemplary rule for setting the situation mode of the mobile device 1 can be decided as the following table:

| Event Type | N/A | Meeting | Date | Going out | User defined |
|---|---|---|---|---|---|
| Situation mode | General mode | Vibration mode | Silent mode | Outdoor mode | User defined |

Therefore, according to the example of FIG. 6, the situation mode of the mobile device 1 is switched to the silent mode during the event coded 0001, i.e., during 18:00-20:00 on Nov. 6, 2012.

It is noted that, if the mobile device 1 has an updated configuration document 32, the mobile device 1 can also initiate and rapidly achieve information synchronization with the computer 2 according to the method of the present invention.

In view of the above, the method of this invention utilizes NFC techniques and cooperates with the synchronization module applications 122, 222, the calendar module applications 121, 221 and the calling module application 123. Therefore, information synchronization between the mobile device 1 and the computer 2 can be rapidly performed with a minimized amount of data transmission. In addition, the situation mode of the mobile device 1 can be appropriately set based on the difference configuration document without complicated manual operations. Furthermore, authentication between the mobile device 1 and the computer 2 is indeed performed during information synchronization, thereby enhancing security of communications between the mobile device 1 and the computer 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for rapid synchronization of information between a first terminal and a second terminal using near field communication (NFC), the first terminal including a first NFC circuit, a memory for storing a synchronization module application and a prior configuration document therein, and a controller capable of reading the synchronization module application from the memory and executing the synchronization module application, the second terminal including a second NFC circuit, a storage device for storing the prior configuration document, and a processor, the second terminal having an updated configuration document more recently recorded thereby than the prior configuration document, said method comprising the steps of:
   a) performing authentication between the first and second terminals;
   b) when the authentication between the first and second terminals performed in step a) is successful, the processor of the second terminal comparing the prior configuration document from the storage device of the second terminal with the updated configuration document to obtain a difference configuration document which is representative of a difference between the prior configuration document and the updated configuration document;
   c) the second terminal transmitting the difference configuration document through the second NFC circuit to the first terminal; and
   d) upon receipt of the difference configuration document by the first terminal through the first NFC circuit, the controller of the first terminal performing setting in correspondence with the difference configuration document.

2. The method as claimed in claim 1, wherein each of the prior configuration document, the updated configuration document and the difference configuration document includes an event serial number, and at least one of an event type, a single/periodic event indication, a single-event time condition, a periodic-event cycling condition and an event description.

3. The method as claimed in claim 2, the memory of the first terminal further storing a calendar module application that is executable to manage an event calendar stored in the memory, wherein:
   the setting performed in step d) is to set the event calendar stored in the memory of the first terminal by executing the calendar module application in accordance with the difference configuration document.

4. The method as claimed in claim 3, the first terminal further including a speaker, a microphone and a vibrator, the memory of the first terminal further storing a calling module application, the event calendar including at least one event that includes information of an event type, an event time and an event description, wherein:
   the setting performed in step d) is further to set a situational mode of the first terminal in one of a general mode, a silent mode, a vibration mode, an outdoor mode, and a quiet mode by executing the calling module application in accordance with the event type and the event time of the at least one event in the event calendar; and
   the controller of the first terminal is operable to control at least one of the speaker, the microphone, and the vibrator in accordance with the situational mode during the event time of the at least one event.

5. The method as claimed in claim 1, prior to step a), further comprising the step of:
   a0) establishing a communication link between the first and second terminals;
   wherein step a) further includes the sub-steps of
   a1) the first terminal transmitting a first authentication code, which uniquely corresponds to the first terminal, and a synchronization request through the first NFC circuit to the second terminal, and
   a2) upon receipt of the first authentication code and the synchronization request by the second terminal through the second NFC circuit, the processor of the second terminal determining whether the first authentication code coincides with a reference authentication code pre-stored in the storage device of the second terminal;
   wherein, when it is determined that the first authentication code coincides with the reference authentication code in sub-step a2), the authentication between the first and second terminals performed in step a) is successful.

6. The method as claimed in claim 1, prior to step a), further comprising the step of:
   a0) establishing a communication link between the first terminal and the second terminal;
   wherein step a) further includes the sub-steps of
   a1) the second terminal transmitting a second authentication code, which uniquely corresponds to the second terminal, and a synchronization request through the second NFC circuit to the first terminal,
   a2) upon receipt of the second authentication code and the synchronization request by the first terminal through the first NFC circuit, the controller of the first terminal determining whether the second authentication code coincides with a first reference authentication code pre-stored in the memory of the first terminal;
   a3) when it is determined in sub-step a2) that the second authentication code coincides with the first reference authentication code, the first terminal transmitting a first authentication code, which uniquely corresponds to the first terminal, and a document request through the first NFC circuit to the second terminal in response to the synchronization request transmitted from the second terminal in sub-step a1), and
   a4) upon receipt of the first authentication code and the document request by the second terminal through the second NFC circuit, the processor of the second terminal determining whether the first authentication code coincides with a second reference authentication code pre-stored in the storage device of the second terminal;
   wherein, when it is determined that the second authentication code coincides with the first reference authentication code in sub-step a2) while it is determined that the first authentication code coincides with the second reference authentication code in sub-step a4), the authentication between the first and second terminals performed in step a) is successful; and
   wherein, in step c), the second terminal transmits the difference configuration document through the second NFC circuit to the first terminal in response to the document request transmitted from the first terminal in sub-step a3).

\* \* \* \* \*